(12) United States Patent
Kobilka et al.

(10) Patent No.: US 10,035,877 B1
(45) Date of Patent: Jul. 31, 2018

(54) MATRIX-BONDABLE LACTIDE MONOMORS FOR POLYLACTIDE SYNTHESIS

(71) Applicant: International Business Machines Corporation, Armonk, NY (US)

(72) Inventors: Brandon M. Kobilka, Tucson, AZ (US); Joseph Kuczynski, North Port, FL (US); Jacob T. Porter, Highland, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/452,880

(22) Filed: Mar. 8, 2017

(51) Int. Cl.
| | |
|---|---|
| C08G 63/664 | (2006.01) |
| C08L 67/04 | (2006.01) |
| C08L 101/00 | (2006.01) |
| C08G 63/78 | (2006.01) |
| C08G 63/695 | (2006.01) |

(52) U.S. Cl.
CPC ....... *C08G 63/664* (2013.01); *C08G 63/6952* (2013.01); *C08G 63/78* (2013.01); *C08L 67/04* (2013.01); *C08L 101/00* (2013.01)

(58) Field of Classification Search
CPC .. C08G 63/664; C08G 63/78; C08G 63/6952; C08L 67/04; C08L 101/00
See application file for complete search history.

(56) References Cited

U.S. PATENT DOCUMENTS

| | | | |
|---|---|---|---|
| 4,065,428 A | 12/1977 | Deets | |
| 5,137,953 A | 8/1992 | Fuhr et al. | |
| 5,852,117 A | 12/1998 | Schoenberg et al. | |
| 6,316,581 B1 | 11/2001 | Gross et al. | |
| 6,339,166 B1 | 1/2002 | Allcock et al. | |
| 6,740,731 B2 | 5/2004 | Bigg et al. | |
| 7,071,288 B2 | 7/2006 | Smith et al. | |
| 7,709,569 B2 | 5/2010 | Rafailovich et al. | |
| 8,741,877 B2 | 6/2014 | Moller et al. | |
| 9,029,497 B2 | 5/2015 | Li et al. | |
| 9,169,334 B2 | 10/2015 | Stewart et al. | |
| 9,193,818 B1 | 11/2015 | Boday et al. | |
| 9,228,044 B2 | 1/2016 | Boday et al. | |
| 9,260,550 B1 | 2/2016 | Boday et al. | |
| 9,346,915 B2 | 5/2016 | Nemoto et al. | |
| 2006/0264573 A1 | 11/2006 | Bennett et al. | |
| 2006/0270779 A1 | 11/2006 | Mochizuki et al. | |
| 2008/0114132 A1 | 5/2008 | Daly et al. | |
| 2009/0054619 A1* | 2/2009 | Baker | C08G 63/08 528/354 |
| 2009/0259000 A1 | 10/2009 | Urakami et al. | |
| 2009/0306333 A1* | 12/2009 | Jing | C07D 319/20 528/356 |
| 2013/0035429 A1 | 2/2013 | Tajima | |
| 2013/0302620 A1 | 11/2013 | Fenn et al. | |
| 2015/0018493 A1 | 1/2015 | Mehrkhodavandi et al. | |
| 2016/0215079 A1 | 7/2016 | Boday et al. | |

FOREIGN PATENT DOCUMENTS

| | | |
|---|---|---|
| CN | 101225224 A | 7/2008 |
| CN | 104371082 A | 2/2015 |
| EP | 0 765 889 A1 | 4/1997 |
| EP | 0 964 027 B1 | 5/2004 |
| EP | 2 013 288 B1 | 2/2013 |
| KR | 10-2011-0113947 | 5/2013 |
| WO | WO-90/01521 A1 | 2/1990 |
| WO | WO-03/027175 A1 | 4/2003 |
| WO | WO-2012/015128 A1 | 2/2012 |
| WO | WO-2012/169761 A2 | 12/2012 |
| WO | WO-2016/134178 A1 | 8/2016 |

OTHER PUBLICATIONS

Gerhardt, W.W., et al.; Biomacromolecules, 2006, vol. 7, p. 1735-1742.*
Noga, D.E., et al.; Biomacromolecules, 2008, vol. 9, p. 2056-2062.*
Buffet et al., *Alkaline earth metal amide complexes containing a cyclen-derived (NNNN) macrocyclic ligand: synthesis, structure, and ring-opening polymerization activity towards lactide monomers*, New Journal of Chemistry, vol. 35, No. 10, Jul. 2011, pp. 2253-57, Royal Society of Chemistry, London.
Noga et al., *Synthesis and Modification of Functional Poly(lactide) Copolymers: Toward Biofunctional Materials*, Biomacromolecules, vol. 9, No. 7, Jun. 2008, pp. 2056-2062, American Chemical Society, Washington, D.C.
Mauldin et al., *An Acrylic Platform from Renewable Resources via a Paradigm Shift in Lactide Polymerization*, ACS Macro Letters, 2016, 5 (4), American Chemical Society, DOI: 10.1021/acsmacrolett.6b00023, Publication Date (Web): Apr. 8, 2016, 3 pages.
IBM, *IBM Academy of Technology Top 10 Technical Themes 2016*, IBM.com (online), accessed Jan. 16, 2017, 2 pages, URL: http://www-03.ibm.com/ibm/academy/tech/tech.shtml.
Verduzco et al., *Structure, function, self-assembly, and applications of bottlebrush copolymers*, Chemical Society Review, Feb. 2015, vol. 44, pp. 2405-2420, The Royal Society of Chemistry, UK.
Scheibelhoffer et al., *Synthesis, Polymerization and Copolymerization of Dimethyleneglycolide and Methylenemethylglycolide*, Polymer Preprints, vol. 10, No. 2, Sep. 1969, pp. 1375-1380, Division of Polymer Chemistry, American Chemical Society, Washington D.C.
Fuoco et al., *A Route to Aliphatic Poly(ester)s with Thiol Pendant Groups: From Monomer Design to Editable Porous Scaffolds*, BioMacromolecules, Feb. 2016, vol. 17, No. 4, pp. 1383-1394, American Chemical Society Publications, Washington, D.C.

(Continued)

*Primary Examiner* — Robert Jones, Jr.
(74) *Attorney, Agent, or Firm* — Roy R. Salvagio; Robert R. Williams; Kennedy Lenart Spraggins LLP

(57) ABSTRACT

A process of forming a matrix-bondable polylactide includes forming a methylidene lactide molecule from an L-lactide molecule. The process includes forming a functionalized lactide monomer from the methylidene lactide molecule. The process also includes forming a lactide feedstock that includes at least the functionalized lactide monomer. The process further includes polymerizing the lactide feedstock to form the matrix-bondable polylactide.

19 Claims, 8 Drawing Sheets

(56) References Cited

OTHER PUBLICATIONS

Partlo III, *Reductively Degradable Polymeric Biomaterials*, Dissertation, Jan. 2015, 111 pages, University of Minnesota, USA.
Li et al., *Highly-effective Flame Retardancy of Poly(lactide) Composite Achieved Through Incorporation of Amorphous Nickel Phosphate Microparticle*, Polymer-Plastics Technology and Engineering, Aug. 2014, vol. 53, Issue 15, pp. 1533-1541, Taylor & Francis Group, an Informa Business, London.
Jing et al., *A Bifunctional Monomer Derived from Lactide for Toughening Polylactide*, Journal of the American Chemical Society (JACS) Communications, Sep. 2008, vol. 130, Issue 42, pp. 13826-13827, American Chemical Society Publications, Washington, D.C.
Price et al., *Flame retardance of poly(methyl methacrylate) modified with phosphorus-containing compounds*, Polymer Degradation and Stability, Mar. 2002, vol. 77, Issue 2, pp. 227-233, Elsevier Science Ltd, Amsterdam, Netherlands.
*Altuglas International and NatureWorks Launch Worldwide Marketing Collaboration for New High Performance Alloys Incorporating Ingeo(TM) Biopolymers*, globenewswire.com (online), Dec. 11, 2012, 2 pages, URL: globenewswire.com/news-release/2012/12/11/510816/10015271/en/Altuglas-International-and-NatureWorks-Launch-Worldwide-Marketing-Collaboration-for-New-High-Performance-Alloys-Incorporating-Ingeo-TM-Biopolymers.html.
Abayasinghe et al., *Terpolymers from Lactide and Bisphenol A Derivatives: Introducing Renewable Resource Monomers into Commodity Thermoplastics*, Macromolecules, vol. 36, No. 26, Dec. 2003, pp. 9681-9683, American Chemical Society, Washington, D.C.
Britner et al., *Self-Activation of Poly(methylenelactide) through Neighboring-Group Effects: A Sophisticated Type of Reactive Polymer*, Macromolecules, vol. 48, No. 11, May 2015, pp. 3516-3522, American Chemical Society, Washington, D.C.
AUS920160668US1, Appendix P; List of IBM Patent or Applications Treated as Related, Jun. 1, 2017, 2 pages.
U.S. Appl. No. 15/452,996, to Brandon M. Kobilka et al., entitled, *Bottlebrush Polymers Derived From Poly(Methylidenelactide)*, assigned to International Business Machines Corporation, 23 pages, filed Mar. 8, 2017.
U.S. Appl. No. 15/452,914, to Brandon M. Kobilka et al., entitled, *Flame Retardant Lactide Monomors for Polylactide Synthesis*, assigned to International Business Machines Corporation, 47 pages, filed Mar. 8, 2017.
U.S. Appl. No. 15/453,104, to Brandon M. Kobilka et al., entitled, *Lactide Copolymers and Ring-Opened Lactide Copolymers*, assigned to International Business Machines Corporation, 24 pages, filed Mar. 8, 2017.

\* cited by examiner

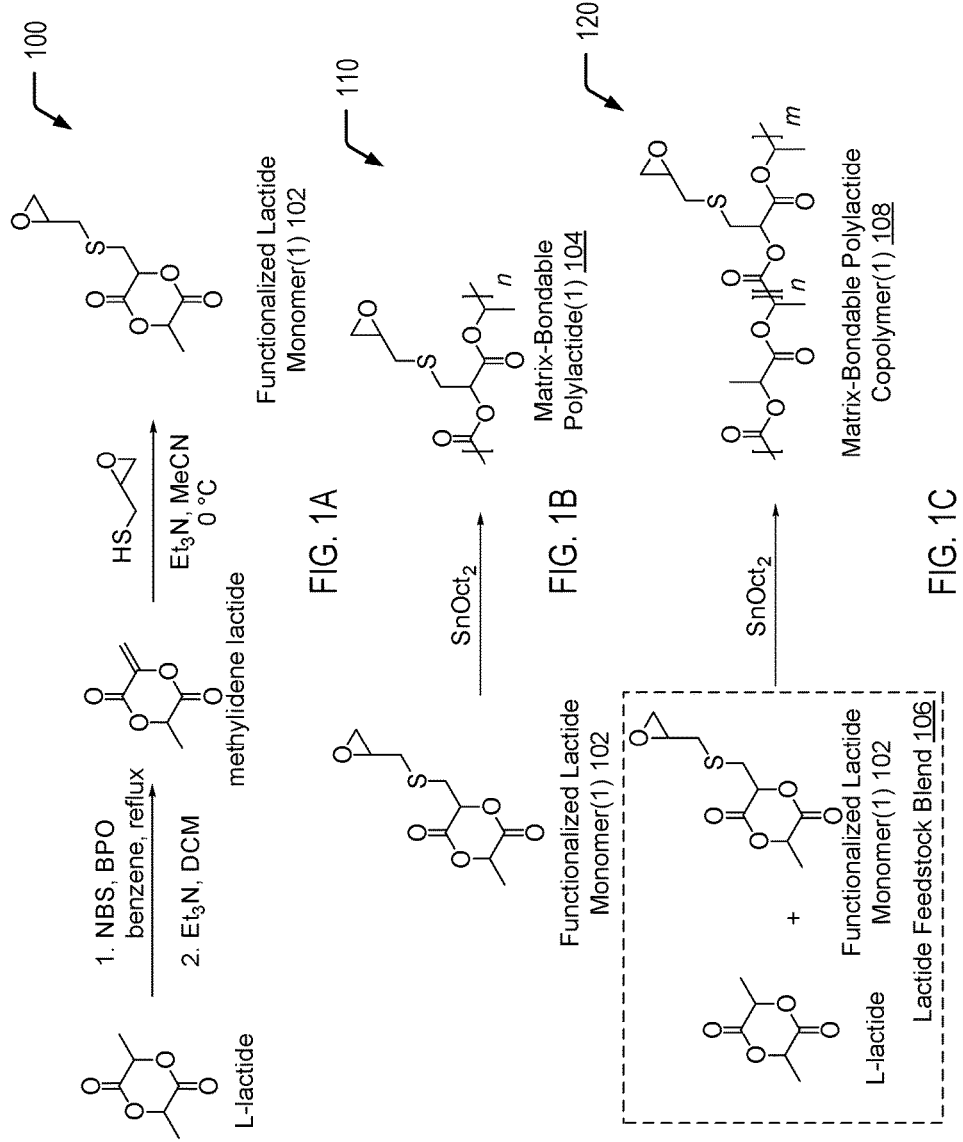

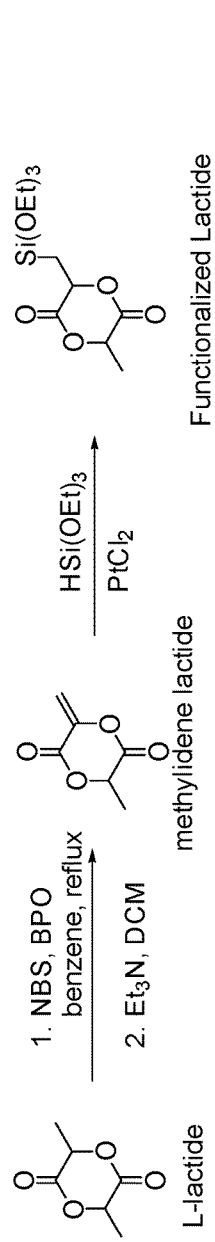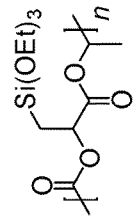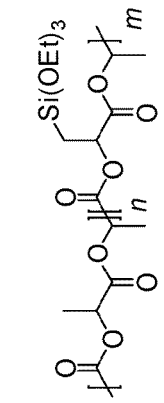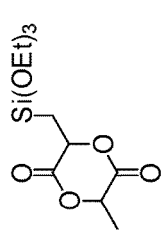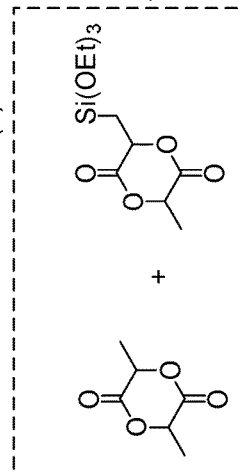
FIG. 2A
FIG. 2B
FIG. 2C

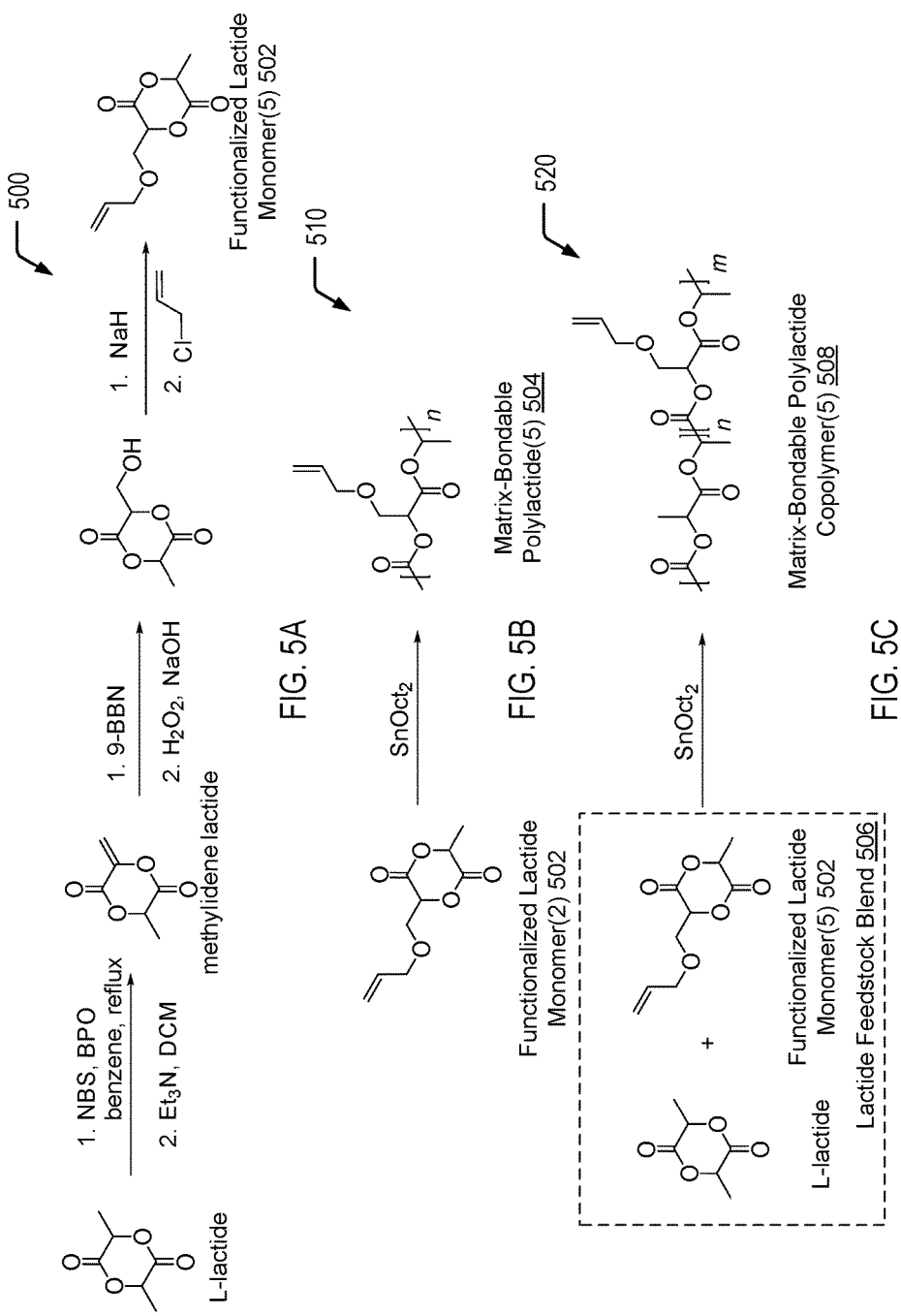

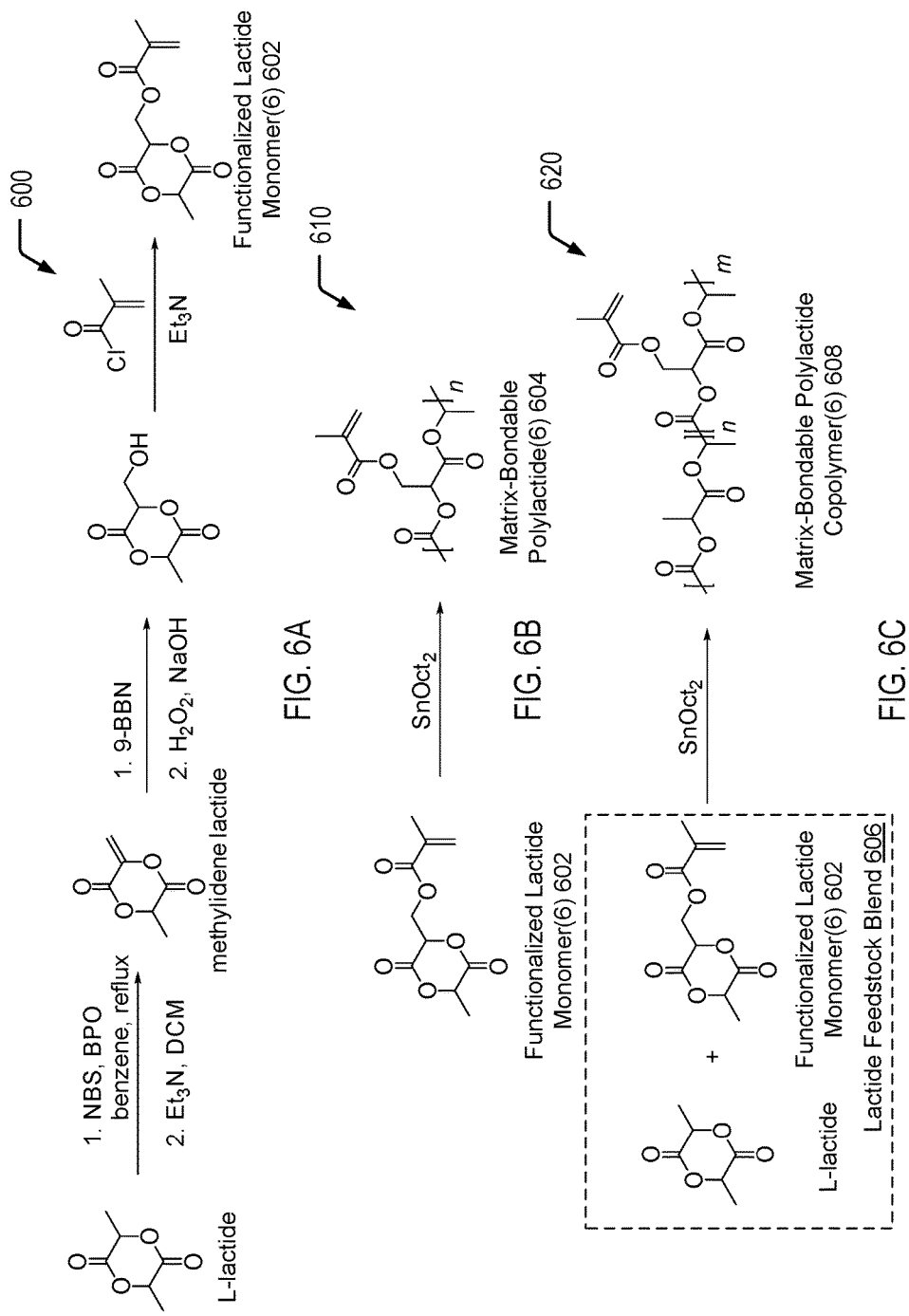

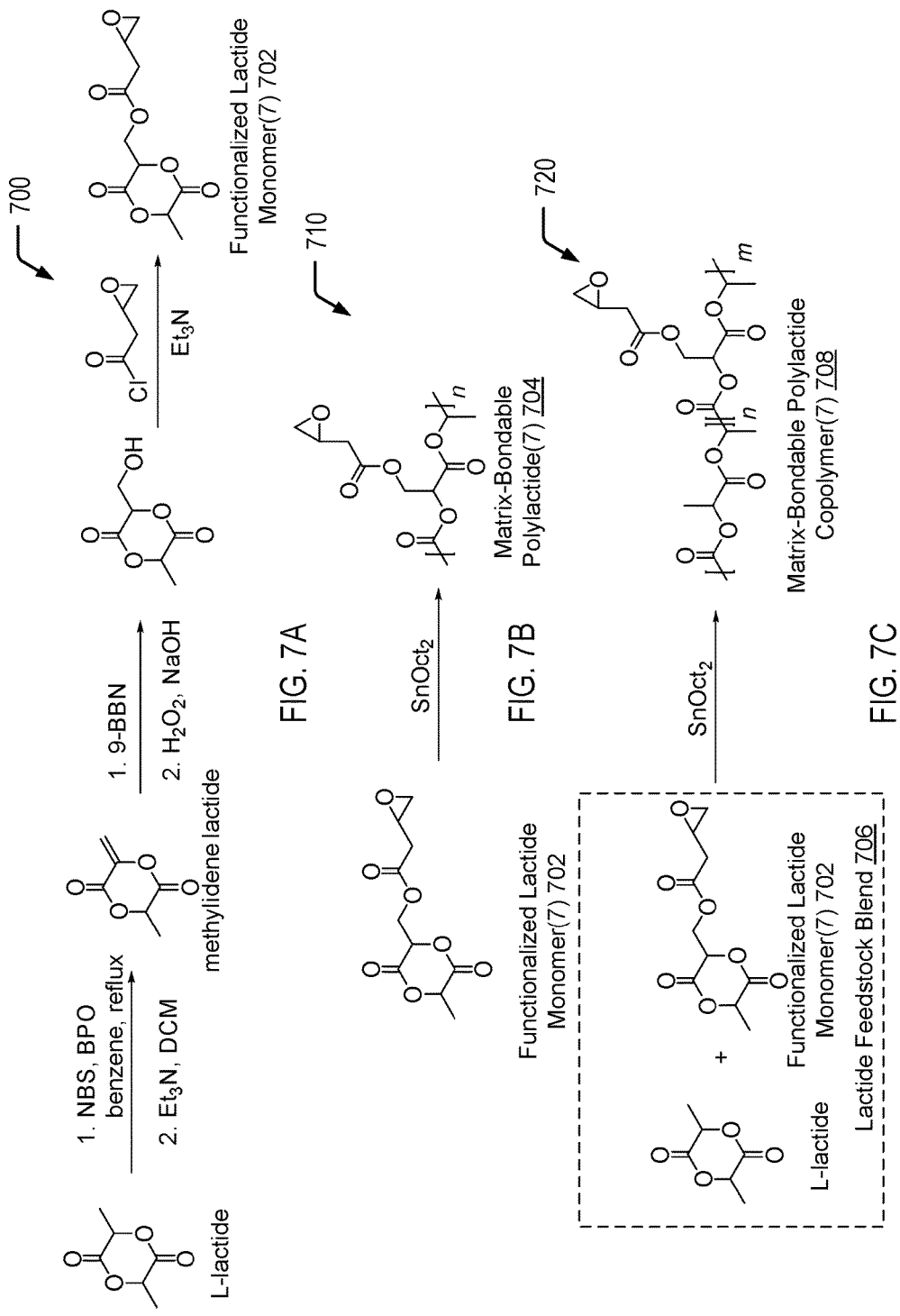

MATRIX-BONDABLE LACTIDE MONOMORS FOR POLYLACTIDE SYNTHESIS

BACKGROUND

Plastics are typically derived from a finite and dwindling supply of petrochemicals, resulting in price fluctuations and supply chain instability. Replacing non-renewable petroleum-based polymers with polymers derived from renewable resources may be desirable. However, there may be limited alternatives to petroleum-based polymers in certain contexts. To illustrate, particular plastics performance standards may be specified by a standards body or by a regulatory agency. In some cases, alternatives to petroleum-based polymers may be limited as a result of challenges associated with satisfying particular plastics performance standards.

SUMMARY

According to an embodiment, a process of forming a matrix-bondable polylactide is disclosed. The process includes forming a methylidene lactide molecule from an L-lactide molecule. The process includes forming a functionalized lactide monomer from the methylidene lactide molecule. The process also includes forming a lactide feedstock that includes at least the functionalized lactide monomer. The process further includes polymerizing the lactide feedstock to form the matrix-bondable polylactide.

According to another embodiment, a matrix-bondable polylactide is disclosed. The matrix-bondable polylactide is formed by a process that includes forming a lactide feedstock that includes at least a functionalized lactide monomer and is derived from a methylidene lactide molecule that is formed from an L-lactide molecule. The process also includes polymerizing the lactide feedstock to form the matrix-bondable polylactide.

According to another embodiment, an article of manufacture is disclosed. The article of manufacture is formed by a process that includes forming a lactide feedstock that includes at least a functionalized lactide monomer derived from a methylidene lactide molecule (that is formed from an L-lactide molecule). The process includes polymerizing the lactide feedstock to form a matrix-bondable polylactide. The process also includes forming a mixture that includes the matrix-bondable polylactide and a polymeric matrix material. The process further includes initiating a chemical reaction to form a cross-linked polymeric material from the mixture and forming the article of manufacture from the cross-linked polymeric material.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 1A is a chemical reaction diagram illustrating an example of a process of forming a first functionalized lactide monomer that is derived from a methylidene lactide molecule, according to an embodiment.

FIG. 1B is a chemical reaction diagram illustrating an example of a process of utilizing the first functionalized lactide monomer of FIG. 1A to form a first matrix-bondable polylactide.

FIG. 1C is a chemical reaction diagram illustrating an example of a process of forming a first matrix-bondable polylactide copolymer from a monomer blend that includes an L-lactide monomer and the first functionalized lactide monomer of FIG. 1A, according to one embodiment.

FIG. 2A is a chemical reaction diagram illustrating an example of a process of forming a second functionalized lactide monomer that is derived from a methylidene lactide molecule, according to an embodiment.

FIG. 2B is a chemical reaction diagram illustrating an example of a process of utilizing the second functionalized lactide monomer of FIG. 2A to form a second matrix-bondable polylactide.

FIG. 2C is a chemical reaction diagram illustrating an example of a process of forming a second matrix-bondable polylactide copolymer from a monomer blend that includes an L-lactide monomer and the second functionalized lactide monomer of FIG. 2A, according to one embodiment.

FIG. 5A is a chemical reaction diagram illustrating an example of a process of forming a fifth functionalized lactide monomer that is derived from a methylidene lactide molecule, according to an embodiment.

FIG. 5B is a chemical reaction diagram illustrating an example of a process of utilizing the fifth functionalized lactide monomer of FIG. 5A to form a fifth matrix-bondable polylactide.

FIG. 5C is a chemical reaction diagram illustrating an example of a process of forming a fifth matrix-bondable polylactide copolymer from a monomer blend that includes an L-lactide monomer and the fifth functionalized lactide monomer of FIG. 5A, according to one embodiment.

FIG. 6A is a chemical reaction diagram illustrating an example of a process of forming a sixth functionalized lactide monomer that is derived from a methylidene lactide molecule, according to an embodiment.

FIG. 6B is a chemical reaction diagram illustrating an example of a process of utilizing the sixth functionalized lactide monomer of FIG. 6A to form a sixth matrix-bondable polylactide.

FIG. 6C is a chemical reaction diagram illustrating an example of a process of forming a sixth matrix-bondable polylactide copolymer from a monomer blend that includes an L-lactide monomer and the sixth functionalized lactide monomer of FIG. 6A, according to one embodiment.

FIG. 7A is a chemical reaction diagram illustrating an example of a process of forming a seventh functionalized lactide monomer that is derived from a methylidene lactide molecule, according to an embodiment.

FIG. 7B is a chemical reaction diagram illustrating an example of a process of utilizing the seventh functionalized lactide monomer of FIG. 7A to form a seventh matrix-bondable polylactide.

FIG. 7C is a chemical reaction diagram illustrating an example of a process of forming a seventh matrix-bondable polylactide copolymer from a monomer blend that includes an L-lactide monomer and the seventh functionalized lactide monomer of FIG. 7A, according to one embodiment.

DETAILED DESCRIPTION

Figures 3A, 3B, 3C:
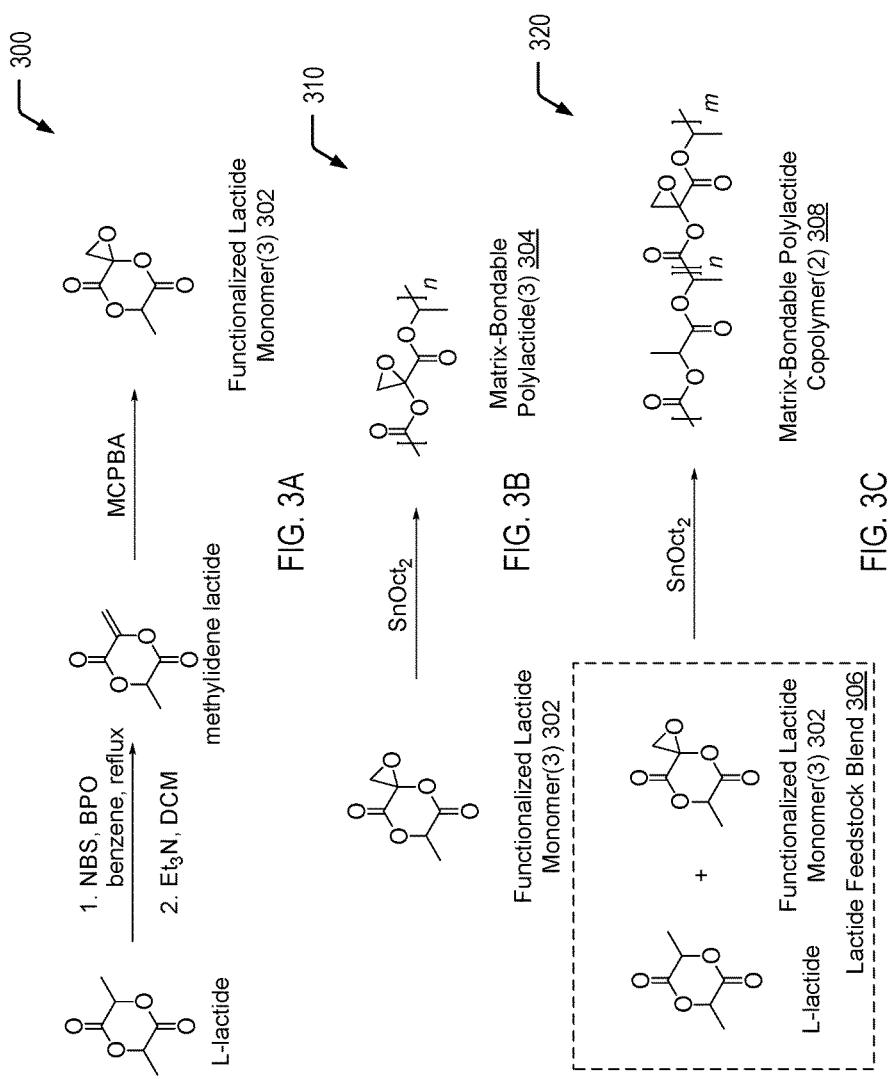
FIG. 3A is a chemical reaction diagram illustrating an example of a process of forming a third functionalized lactide monomer that is derived from a methylidene lactide molecule, according to an embodiment.
FIG. 3B is a chemical reaction diagram illustrating an example of a process of utilizing the third functionalized lactide monomer of FIG. 3A to form a third matrix-bondable polylactide.
FIG. 3C is a chemical reaction diagram illustrating an example of a process of forming a third matrix-bondable polylactide copolymer from a monomer blend that includes an L-lactide monomer and the third functionalized lactide monomer of FIG. 3A, according to one embodiment.

The present disclosure describes functionalized lactide monomers and matrix-bondable polylactides formed from the functionalized lactide monomers. In the present disclosure, an L-lactide molecule may be utilized to form a methylidene lactide molecule. The exocyclic double bond on the methylidene lactide molecule can undergo further functionalization to create lactide monomers with functional groups (also referred to herein as "functionalized lactide monomers"). In some cases, these functional groups may be used to bond into various polymer matrices after the functionalized lactide monomers are incorporated into a polylactide.

As described further herein, functionalization of the methylidene lactide molecule (or derivatives thereof) may include the addition of various functional groups (e.g., epoxy groups, siloxane groups, vinyl groups, acrylate groups, etc.) that may be subsequently utilized for bonding a polylactide into a particular matrix material (e.g., a resin material). The particular functional group (or combination of functional groups) may be selected based on the particular matrix material. In some cases, the functionalized lactide monomers of the present disclosure may be utilized to form stand-alone matrix-bondable polylactides. In other cases, the functionalized lactide monomers may be blended with a "conventional" L-lactide monomer, and the blend may be polymerized to form matrix-bondable polylactide copolymers.

Referring to FIG. 1A, a chemical reaction diagram 100 illustrates an example of a process of forming a first functionalized lactide monomer 102. FIG. 1B illustrates that, in some cases, the first functionalized lactide monomer 102 of FIG. 1A may be utilized to form a first matrix-bondable polylactide 104. FIG. 1C illustrates that, in some cases, a blend 106 (identified as "Lactide Feedstock Blend" in FIG. 1C) that includes an L-lactide monomer and the first functionalized lactide monomer 102 of FIG. 1A may be used to form a first matrix-bondable polylactide copolymer 108.

The first chemical reaction depicted in FIG. 1A illustrates the formation of a methylidene lactide molecule from an L-lactide molecule. In a particular embodiment (identified as step 1 in FIG. 1A), formation of the methylidene lactide molecule may include radical bromination of the alpha carbon of the L-lactide molecule by N-bromosuccinimide (NBS) using a radical initiator such as benzoyl peroxide (BPO) in a solvent such as benzene, among other alternatives. Subsequently (identified as step 2 in FIG. 1A), elimination with triethylamine (NEt$_3$) in a solvent such as dichloromethane (DCM) results in the formation of the methylidene lactide intermediate material.

The second chemical reaction depicted in FIG. 1A illustrates that the first functionalized lactide monomer 102 may be synthesized from the methylidene lactide intermediate material. In a particular embodiment, the second chemical reaction of FIG. 1A may include chemically reacting the methylidene lactide intermediate material with oxiranemethanethiol and an amine base (e.g., triethylamine) to form the first functionalized lactide monomer 102, representing an example of a thioether-linked epoxy lactide. As a prophetic example, to a solution of 2-Oxiranemethanethiol (1.05 equiv.), and triethylamine (0.2 equiv.) in anhydrous acetonitrile, may be added a solution of DML (1.0 equiv.) in anhydrous acetonitrile, dropwise at 0° C., under an inert atmosphere. The reaction mixture may be stirred for 1.5 hours at 0° C., and then concentrated by about 80% in vacuo. The concentrated solution may be dissolved in ethyl acetate and washed with 0.1 M HCl (×3), dried over MgSO$_4$, filtered, and the solvents removed in vacuo. The resulting solid may be purified by column chromatography or recrystallization.

Referring to FIG. 1B, a chemical reaction diagram 110 illustrates that the first functionalized lactide monomer 102 of FIG. 1A may be used to form a first matrix-bondable polylactide 104. In a particular embodiment, synthesis of the first matrix-bondable polylactide 104 may include the use of Lewis acid conditions, such as heating as a melt with tin(II) octanoate (identified as "SnOct$_2$" in FIG. 1B).

Referring to FIG. 1C, a chemical reaction diagram 120 illustrates an example of a process of forming a first matrix-bondable polylactide copolymer 108 from a blend 106 (identified as "Lactide Feedstock Blend" in FIG. 1C) that includes an unmodified L-lactide monomer and the first functionalized lactide monomer 102 of FIG. 1A. In the example of FIG. 1C, synthesis of the first matrix-bondable polylactide copolymer 108 from the blend 106 includes the use of Lewis acid conditions, such as heating as a melt with tin(II) octanoate.

FIG. 1C illustrates an example in which at least one of the functionalized lactide monomers of the present disclosure may be incorporated into a lactide polymer backbone by adding desired amount(s) of the functionalized lactide monomer(s) to a lactide feedstock prior to polymerization. In the particular embodiment depicted in FIG. 1C, the first functionalized lactide monomer 102 of FIG. 1A may be incorporated into the lactide polymer backbone by forming the blend 106. The blend 106 may include a first amount of the "conventional" L-lactide monomer and a second amount of the first functionalized lactide monomer 102 of FIG. 1A. Polymerization of the blend 106 results in the formation of a first matrix-bondable polylactide copolymer 108. In some cases, the matrix-bonding characteristics of the first matrix-bondable polylactide copolymer 108 may be "tuned" by varying the composition of the blend 106.

In FIG. 1C, the integer n is used to identify a portion of the lactide polymer backbone that corresponds to the L-lactide monomer (after ring-opening polymerization), and the integer m is used to identify a portion of the lactide polymer backbone that corresponds to the first functionalized lactide monomer 102 (after ring-opening polymerization). FIG. 1C depicts a particular embodiment in which a single functionalized lactide monomer of the present disclosure (e.g., the first functionalized lactide monomer 102 of FIG. 1A) is incorporated into the lactide polymer backbone. In other cases, the first functionalized lactide monomer 102 of FIG. 1A may be blended with one or more additional functionalized lactide monomers of the present disclosure in order to incorporate more than one cross-linkable moiety into a lactide polymer backbone. Other examples of functionalized lactide monomers are illustrated and further described herein with respect to FIGS. 2A, 3A, 4A, 5A, 6A, and 7A.

Thus, FIGS. 1A-1C illustrate an example of a process of forming a functionalized lactide monomer and utilizing the functionalized lactide monomer to form matrix-bondable polylactides or matrix-bondable polylactide copolymers. While not shown in the example of FIGS. 1A-1C, the polylactides (functionalized with epoxy groups) may be mixed with a particular polymeric matrix material (e.g., an epoxy-reactive polymer) in order to form a cross-linked polymeric material. The cross-linked polymeric material may be utilized to form an article of manufacture.

Referring to FIG. 2A, a chemical reaction diagram 200 illustrates an example of a process of forming a second functionalized lactide monomer 202. FIG. 2B illustrates that, in some cases, the second functionalized lactide monomer 202 of FIG. 2A may be utilized to form a second matrix-bondable polylactide 204. FIG. 2C illustrates that, in some cases, a blend 206 (identified as "Lactide Feedstock Blend" in FIG. 2C) that includes an L-lactide monomer and the second functionalized lactide monomer 202 of FIG. 2A may be used to form a second matrix-bondable polylactide copolymer 208.

The first chemical reaction depicted in FIG. 2A illustrates the formation of a methylidene lactide molecule from an L-lactide molecule. The process of forming the methylidene lactide molecule may be similar to the process previously described herein with respect to FIG. 1A. The second chemical reaction depicted in FIG. 2A illustrates that the second functionalized lactide monomer 202 may be synthesized from the methylidene lactide intermediate material. In a particular embodiment, the second chemical reaction of FIG. 2A may include chemically reacting the methylidene lactide intermediate material with a triethoxysilane (e.g., HSi(OEt)$_3$) under hydrosilation conditions (e.g., using a Pt catalyst) to form the second functionalized lactide monomer 202, representing an example of a siloxane lactide. As a prophetic example, a solution of XPhos (10 mol %) and PtCl$_2$ (5 mol %) in THF may be heated to 60° C. After 15 min, a solution of methylidene lactide (1.0 equiv.) and (EtO)$_3$SiH (5.0 equiv.) in THF may be added. After 6.5 hours, the solution may be cooled to room temperature and concentrated in vacuo. The crude product may be purified by column chromatography eluting with a EtOAc/hexane gradient (1% to 10% EtOAc).

Referring to FIG. 2B, a chemical reaction diagram 210 illustrates that the second functionalized lactide monomer 202 of FIG. 2A may be used to form a second matrix-bondable polylactide 204. In a particular embodiment, synthesis of the second matrix-bondable polylactide 204 may include the use of Lewis acid conditions, such as heating as a melt with tin(II) octanoate (identified as "SnOct$_2$" in FIG. 2B).

Referring to FIG. 2C, a chemical reaction diagram 220 illustrates an example of a process of forming a second matrix-bondable polylactide copolymer 208 from a blend 206 (identified as "Lactide Feedstock Blend" in FIG. 2C) that includes an unmodified L-lactide monomer and the second functionalized lactide monomer 202 of FIG. 2A. In the example of FIG. 2C, synthesis of the second matrix-bondable polylactide copolymer 208 from the blend 206 includes the use of Lewis acid conditions, such as heating as a melt with tin(II) octanoate.

FIG. 2C illustrates an example in which at least one of the functionalized lactide monomers of the present disclosure may be incorporated into a lactide polymer backbone by adding desired amount(s) of the functionalized lactide monomer(s) to a lactide feedstock prior to polymerization. In the particular embodiment depicted in FIG. 2C, the second functionalized lactide monomer 202 of FIG. 2A may be incorporated into the lactide polymer backbone by forming the blend 206. The blend 206 may include a first amount of the "conventional" L-lactide monomer and a second amount of the second functionalized lactide monomer 202 of FIG. 2A. Polymerization of the blend 206 results in the formation of a second matrix-bondable polylactide copolymer 208. In some cases, the matrix-bonding characteristics of the second matrix-bondable polylactide copolymer 208 may be "tuned" by varying the composition of the blend 206.

In FIG. 2C, the integer n is used to identify a portion of the lactide polymer backbone that corresponds to the L-lactide monomer (after ring-opening polymerization), and the integer m is used to identify a portion of the lactide polymer backbone that corresponds to the second functionalized lactide monomer 202 (after ring-opening polymerization). FIG. 2C depicts a particular embodiment in which a single functionalized lactide monomer of the present disclosure (e.g., the second functionalized lactide monomer 202 of FIG. 2A) is incorporated into the lactide polymer backbone. In other cases, the second functionalized lactide monomer 202 of FIG. 2A may be blended with one or more additional functionalized lactide monomers of the present disclosure in order to incorporate more than one cross-linkable moiety into a lactide polymer backbone. Other examples of functionalized lactide monomers are illustrated and further described herein with respect to FIGS. 1A, 3A, 4A, 5A, 6A, and 7A.

Thus, FIGS. 2A-2C illustrate an example of a process of forming a functionalized lactide monomer and utilizing the functionalized lactide monomer to form matrix-bondable polylactides or matrix-bondable polylactide copolymers. While not shown in the example of FIGS. 2A-2C, the polylactides (functionalized with siloxane groups) may be mixed with a particular polymeric matrix material (e.g., a siloxane-reactive polymer) in order to form a cross-linked polymeric material. The cross-linked polymeric material may be utilized to form an article of manufacture.

Referring to FIG. 3A, a chemical reaction diagram 300 illustrates an example of a process of forming a third functionalized lactide monomer 302. FIG. 3B illustrates that, in some cases, the third functionalized lactide monomer 302 of FIG. 3A may be utilized to form a third matrix-bondable polylactide 304. FIG. 3C illustrates that, in some cases, a blend 306 (identified as "Lactide Feedstock Blend" in FIG. 3C) that includes an L-lactide monomer and the third functionalized lactide monomer 302 of FIG. 3A may be used to form a third matrix-bondable polylactide copolymer 308.

The first chemical reaction depicted in FIG. 3A illustrates the formation of a methylidene lactide molecule from an L-lactide molecule. The process of forming the methylidene lactide molecule may be similar to the process previously described herein with respect to FIG. 1A. The second chemical reaction depicted in FIG. 3A illustrates that the third functionalized lactide monomer 302 may be synthesized from the methylidene lactide intermediate material. In a particular embodiment, the second chemical reaction of FIG. 3A may include chemically reacting the methylidene lactide intermediate material with meta-chloroperbenzoic acid (MCPBA) to yield the third functionalized lactide monomer 302, representing an example of an epoxy lactide. As a prophetic example, MCPBA (meta-chloroperbenzoic acid, 1.1 equiv.) and methylidene lactide (1.0 equiv.) may be dissolved in dichloromethane. The reaction mixture may be heated with stirring, under reflux, for 24 hours. After completion, the mixture may be washed with a saturated solution of sodium bicarbonate and 10% aqueous sodium bisulfite. Subsequently, the organic phase may be dried over magnesium sulfate, filtered, and the solvents removed in vacuo. The resulting solid may be purified by recrystallization or column chromatography.

Referring to FIG. 3B, a chemical reaction diagram 310 illustrates that the third functionalized lactide monomer 302 of FIG. 3A may be used to form a third matrix-bondable polylactide 304. In a particular embodiment, synthesis of the third matrix-bondable polylactide 304 may include the use of Lewis acid conditions, such as heating as a melt with tin(II) octanoate (identified as "SnOct$_2$" in FIG. 3B).

Referring to FIG. 3C, a chemical reaction diagram 320 illustrates an example of a process of forming a third matrix-bondable polylactide copolymer 308 from a blend 306 (identified as "Lactide Feedstock Blend" in FIG. 3C) that includes an unmodified L-lactide monomer and the third functionalized lactide monomer 302 of FIG. 3A. In the example of FIG. 3C, synthesis of the third matrix-bondable polylactide copolymer 308 from the blend 306 includes the use of Lewis acid conditions, such as heating as a melt with tin(II) octanoate.

FIG. 3C illustrates an example in which at least one of the functionalized lactide monomers of the present disclosure may be incorporated into a lactide polymer backbone by adding desired amount(s) of the functionalized lactide monomer(s) to a lactide feedstock prior to polymerization. In the particular embodiment depicted in FIG. 3C, the third functionalized lactide monomer 302 of FIG. 3A may be incorporated into the lactide polymer backbone by forming the blend 306. The blend 306 may include a first amount of the "conventional" L-lactide monomer and a second amount of the third functionalized lactide monomer 302 of FIG. 3A. Polymerization of the blend 306 results in the formation of a third matrix-bondable polylactide copolymer 308. In some cases, the matrix-bonding characteristics of the third matrix-bondable polylactide copolymer 308 may be "tuned" by varying the composition of the blend 306.

In FIG. 3C, the integer n is used to identify a portion of the lactide polymer backbone that corresponds to the L-lactide monomer (after ring-opening polymerization), and the integer m is used to identify a portion of the lactide polymer backbone that corresponds to the third functionalized lactide monomer 302 (after ring-opening polymerization). FIG. 3C depicts a particular embodiment in which a single functionalized lactide monomer of the present disclosure (e.g., the third functionalized lactide monomer 302 of FIG. 3A) is incorporated into the lactide polymer backbone. In other cases, the third functionalized lactide monomer 302 of FIG. 3A may be blended with one or more additional functionalized lactide monomers of the present disclosure in order to incorporate more than one cross-linkable moiety into a lactide polymer backbone. Other examples of functionalized lactide monomers are illustrated and further described herein with respect to FIGS. 1A, 2A, 4A, 5A, 6A, and 7A.

Thus, FIGS. 3A-3C illustrate an example of a process of forming a functionalized lactide monomer and utilizing the functionalized lactide monomer to form matrix-bondable polylactides or matrix-bondable polylactide copolymers. While not shown in the example of FIGS. 3A-3C, the polylactides (functionalized with epoxy groups) may be mixed with a particular polymeric matrix material (e.g., an epoxy-reactive polymer) in order to form a cross-linked polymeric material. The cross-linked polymeric material may be utilized to form an article of manufacture.

Figures 4A, 4B, 4C:
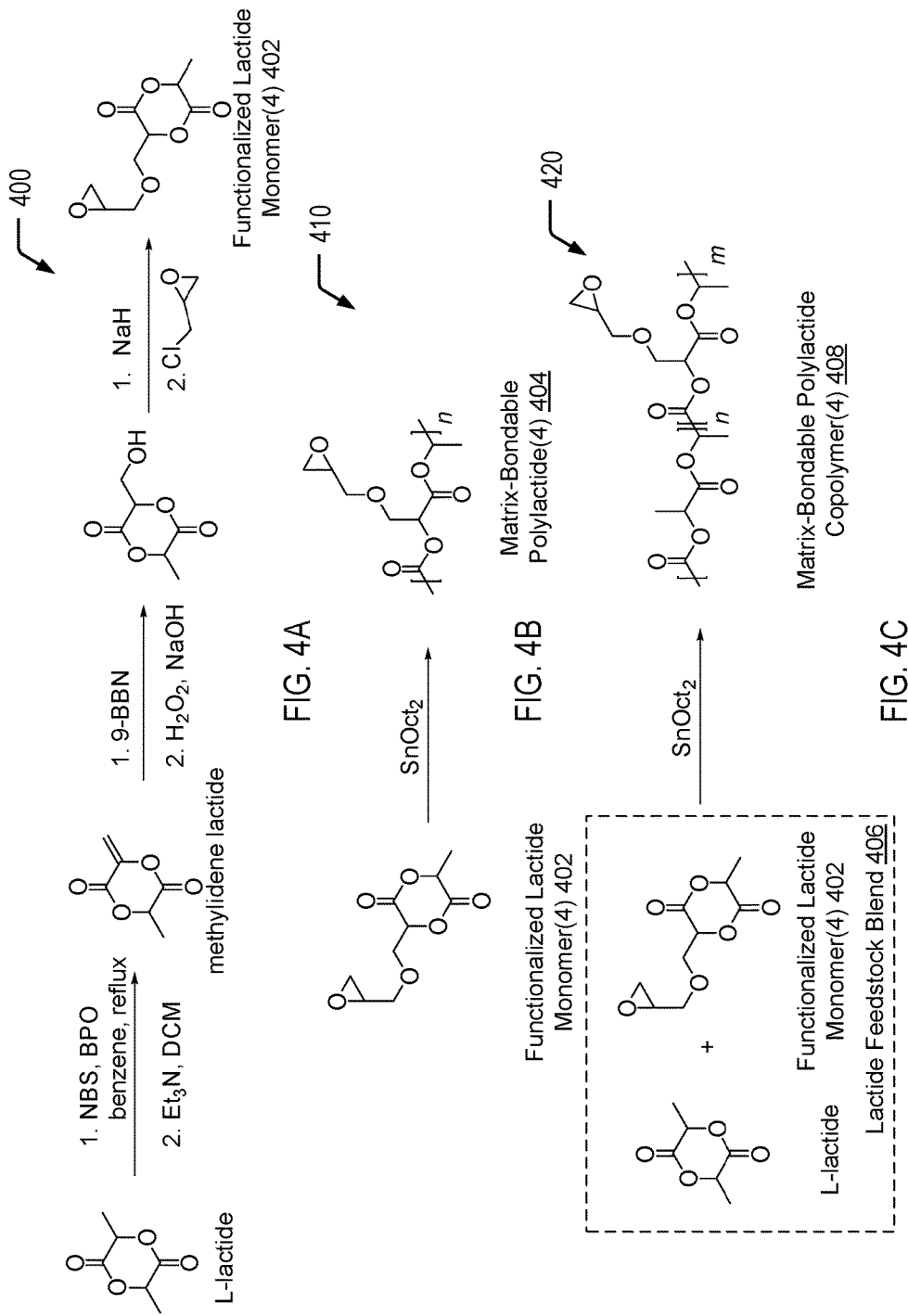
FIG. 4A is a chemical reaction diagram illustrating an example of a process of forming a fourth functionalized lactide monomer that is derived from a methylidene lactide molecule, according to an embodiment.
FIG. 4B is a chemical reaction diagram illustrating an example of a process of utilizing the fourth functionalized lactide monomer of FIG. 4A to form a fourth matrix-bondable polylactide.
FIG. 4C is a chemical reaction diagram illustrating an example of a process of forming a fourth matrix-bondable polylactide copolymer from a monomer blend that includes an L-lactide monomer and the fourth functionalized lactide monomer of FIG. 4A, according to one embodiment.

Referring to FIG. 4A, a chemical reaction diagram 400 illustrates an example of a process of forming a fourth functionalized lactide monomer 402. FIG. 4B illustrates that, in some cases, the fourth functionalized lactide monomer 402 of FIG. 4A may be utilized to form a fourth matrix-bondable polylactide 404. FIG. 4C illustrates that, in some cases, a blend 406 (identified as "Lactide Feedstock Blend" in FIG. 4C) that includes an L-lactide monomer and the fourth functionalized lactide monomer 402 of FIG. 4A may be used to form a fourth matrix-bondable polylactide copolymer 408.

The first chemical reaction depicted in FIG. 4A illustrates the formation of a methylidene lactide molecule from an L-lactide molecule. The process of forming the methylidene lactide molecule may be similar to the process previously described herein with respect to FIG. 1A. The second chemical reaction depicted in FIG. 4A illustrates that a hydroxylactide material may be synthesized from the methylidene lactide intermediate material. In a particular embodiment, the second chemical reaction of FIG. 4A may include chemically reacting the methylidene lactide intermediate material with borane (e.g., 9-BBN) under hydroboration conditions to yield the hydroxylactide material. The third chemical reaction of FIG. 4A illustrates that the fourth functionalized lactide monomer 402 may be synthesized from the hydroxylactide material. In a particular embodiment, the hydroxylactide material may be chemically reacted with epichlorohydrin under basic conditions to form the fourth functionalized lactide monomer 402, representing an example of an ether-linked epoxy lactide. As a prophetic example, 9-BBN (0.5 M in THF, 1.2 equiv.) may be added dropwise over 30 min to a stirred and cooled (0° C.) solution of methylidene lactide (1.0 equiv.) in THF (125 mL). The ice bath may be removed, and stirring may continue for 12 hours. The mixture may be cooled to 0° C. and quenched by dropwise addition of MeOH. Aqueous NaOH (2 M, >1.5 equiv.) and 30% $H_2O_2$ (>10.0 equiv.) may be poured into the stirred mixture. Stirring may continue for 2 hours, and the mixture may be extracted with $Et_2O$. The combined organic extracts may be washed with brine, dried over $Na_2SO_4$, and the solvent may be removed in vacuo. The crude product may be purified through column chromatography. The purified product may be added to a stirred suspension of sodium hydride (1.1 equiv.) in diethyl ether at 0° C., dropwise. The reaction mixture may be stirred for 30 minutes, and may be followed by the addition of epichlorohydrin. The reaction mixture may be warmed to room temperature, stirred for 2 hours, and neutralized with 0.5 M HCl(aq) solution. The layers may be separated, and the aqueous layer may be extracted with $Et_2O$. The combined organic extracts may be washed with brine, dried over $Na_2SO_4$, and the solvent may be removed in vacuo. The crude product may be purified through column chromatography.

Referring to FIG. 4B, a chemical reaction diagram 410 illustrates that the fourth functionalized lactide monomer 402 of FIG. 4A may be used to form a fourth matrix-bondable polylactide 404. In a particular embodiment, synthesis of the fourth matrix-bondable polylactide 404 may include the use of Lewis acid conditions, such as heating as a melt with tin(II) octanoate (identified as "SnOct$_2$" in FIG. 4B).

Referring to FIG. 4C, a chemical reaction diagram 420 illustrates an example of a process of forming a fourth matrix-bondable polylactide copolymer 408 from a blend 406 (identified as "Lactide Feedstock Blend" in FIG. 4C) that includes an unmodified L-lactide monomer and the fourth functionalized lactide monomer 402 of FIG. 4A. In the example of FIG. 4C, synthesis of the fourth matrix-bondable polylactide copolymer 408 from the blend 406 includes the use of Lewis acid conditions, such as heating as a melt with tin(II) octanoate.

FIG. 4C illustrates an example in which at least one of the functionalized lactide monomers of the present disclosure may be incorporated into a lactide polymer backbone by adding desired amount(s) of the functionalized lactide monomer(s) to a lactide feedstock prior to polymerization. In the particular embodiment depicted in FIG. 4C, the fourth functionalized lactide monomer 402 of FIG. 4A may be incorporated into the lactide polymer backbone by forming the blend 406. The blend 406 may include a first amount of the "conventional" L-lactide monomer and a second amount of the fourth functionalized lactide monomer 402 of FIG. 4A. Polymerization of the blend 406 results in the formation of a fourth matrix-bondable polylactide copolymer 408. In some cases, the matrix-bonding characteristics of the fourth matrix-bondable polylactide copolymer 408 may be "tuned" by varying the composition of the blend 406.

In FIG. 4C, the integer n is used to identify a portion of the lactide polymer backbone that corresponds to the L-lactide monomer (after ring-opening polymerization), and the integer m is used to identify a portion of the lactide polymer backbone that corresponds to the fourth functionalized lactide monomer 402 (after ring-opening polymerization). FIG. 4C depicts a particular embodiment in which a single functionalized lactide monomer of the present disclosure (e.g., the fourth functionalized lactide monomer 402 of FIG. 4A) is incorporated into the lactide polymer backbone. In other cases, the fourth functionalized lactide monomer 402 of FIG. 4A may be blended with one or more additional functionalized lactide monomers of the present disclosure in order to incorporate more than one cross-linkable moiety into a lactide polymer backbone. Other examples of functionalized lactide monomers are illustrated and further described herein with respect to FIGS. 1A, 2A, 3A, 5A, 6A, and 7A.

Thus, FIGS. 4A-4C illustrate an example of a process of forming a functionalized lactide monomer and utilizing the functionalized lactide monomer to form matrix-bondable polylactides or matrix-bondable polylactide copolymers. While not shown in the example of FIGS. 4A-4C, the polylactides (functionalized with epoxy groups) may be mixed with a particular polymeric matrix material (e.g., an epoxy-reactive polymer) in order to form a cross-linked polymeric material. The cross-linked polymeric material may be utilized to form an article of manufacture.

Referring to FIG. 5A, a chemical reaction diagram 500 illustrates an example of a process of forming a fifth functionalized lactide monomer 502. FIG. 5B illustrates that, in some cases, the fifth functionalized lactide monomer 502 of FIG. 5A may be utilized to form a fifth matrix-bondable polylactide 504. FIG. 5C illustrates that, in some cases, a blend 506 (identified as "Lactide Feedstock Blend" in FIG. 5C) that includes an L-lactide monomer and the fifth functionalized lactide monomer 502 of FIG. 5A may be used to form a fifth matrix-bondable polylactide copolymer 508.

The first chemical reaction depicted in FIG. 5A illustrates the formation of a methylidene lactide molecule from an L-lactide molecule. The process of forming the methylidene lactide molecule may be similar to the process previously described herein with respect to FIG. 1A. The second chemical reaction depicted in FIG. 5A illustrates that a hydroxylactide material may be synthesized from the methylidene lactide intermediate material, in a manner similar to that previously described herein with respect to FIG. 4A. The third chemical reaction of FIG. 5A illustrates that the fifth functionalized lactide monomer 502 may be synthesized from the hydroxylactide material. In a particular embodiment, the hydroxylactide material may be chemically reacted with allyl chloride under basic conditions to form the fifth functionalized lactide monomer 502, representing an example of an ether-linked allyl lactide. As a prophetic example, 9-BBN (0.5 M in THF, 1.2 equiv.) may be added dropwise over 30 min to a stirred and cooled (0° C.) solution of methylidene lactide (1.0 equiv.) in THF (125 mL). The ice bath may be removed, and stirring may continue for 12 hours. The mixture may be cooled to 0° C. and quenched by dropwise addition of MeOH. Aqueous NaOH (2 M, >1.5 equiv.) and 30% $H_2O_2$ (>10.0 equiv.) may be poured into the stirred mixture. Stirring may continue for 2 hours, and the mixture may be extracted with $Et_2O$. The combined organic extracts may be washed with brine, dried over $Na_2SO_4$, and the solvent may be removed in vacuo. The crude product may be purified through column chromatography. The purified product may be added to a stirred suspension of sodium hydride (1.1 equiv.) in diethyl ether at 0° C., dropwise. The reaction mixture may be stirred for 30 minutes, followed by the addition of allyl chloride. The reaction mixture may be warmed to room temperature, stirred for 2 hours, and neutralized with 0.5 M HCl(aq) solution. The layers may be separated, and the aqueous layer may be extracted with $Et_2O$. The combined organic extracts may be washed with brine, dried over $Na_2SO_4$, and the solvent may be removed in vacuo. The crude product may be purified through column chromatography.

Referring to FIG. 5B, a chemical reaction diagram 510 illustrates that the fifth functionalized lactide monomer 502 of FIG. 5A may be used to form a fifth matrix-bondable polylactide 504. In a particular embodiment, synthesis of the fifth matrix-bondable polylactide 504 may include the use of Lewis acid conditions, such as heating as a melt with tin(II) octanoate (identified as "SnOct$_2$" in FIG. 5B).

Referring to FIG. 5C, a chemical reaction diagram 520 illustrates an example of a process of forming a fifth matrix-bondable polylactide copolymer 508 from a blend 506 (identified as "Lactide Feedstock Blend" in FIG. 5C) that includes an unmodified L-lactide monomer and the fifth functionalized lactide monomer 502 of FIG. 5A. In the example of FIG. 5C, synthesis of the fifth matrix-bondable polylactide copolymer 508 from the blend 506 includes the use of Lewis acid conditions, such as heating as a melt with tin(II) octanoate.

FIG. 5C illustrates an example in which at least one of the functionalized lactide monomers of the present disclosure may be incorporated into a lactide polymer backbone by adding desired amount(s) of the functionalized lactide monomer(s) to a lactide feedstock prior to polymerization. In the particular embodiment depicted in FIG. 5C, the fifth functionalized lactide monomer 502 of FIG. 5A may be incorporated into the lactide polymer backbone by forming the blend 506. The blend 506 may include a first amount of the "conventional" L-lactide monomer and a second amount of the fifth functionalized lactide monomer 502 of FIG. 5A.

Polymerization of the blend 506 results in the formation of a fifth matrix-bondable polylactide copolymer 508. In some cases, the matrix-bonding characteristics of the fifth matrix-bondable polylactide copolymer 508 may be "tuned" by varying the composition of the blend 506.

In FIG. 5C, the integer n is used to identify a portion of the lactide polymer backbone that corresponds to the L-lactide monomer (after ring-opening polymerization), and the integer m is used to identify a portion of the lactide polymer backbone that corresponds to the fifth functionalized lactide monomer 502 (after ring-opening polymerization). FIG. 5C depicts a particular embodiment in which a single functionalized lactide monomer of the present disclosure (e.g., the fifth functionalized lactide monomer 502 of FIG. 5A) is incorporated into the lactide polymer backbone. In other cases, the fifth functionalized lactide monomer 502 of FIG. 5A may be blended with one or more additional functionalized lactide monomers of the present disclosure in order to incorporate more than one cross-linkable moiety into a lactide polymer backbone. Other examples of functionalized lactide monomers are illustrated and further described herein with respect to FIGS. 1A, 2A, 3A, 4A, 6A, and 7A.

Thus, FIGS. 5A-5C illustrate an example of a process of forming a functionalized lactide monomer and utilizing the functionalized lactide monomer to form matrix-bondable polylactides or matrix-bondable polylactide copolymers. While not shown in the example of FIGS. 5A-5C, the polylactides (functionalized with ether-linked allyl groups) may be mixed with a particular polymeric matrix material (e.g., an alkene-reactive polymer) in order to form a cross-linked polymeric material. The cross-linked polymeric material may be utilized to form an article of manufacture.

Referring to FIG. 6A, a chemical reaction diagram 600 illustrates an example of a process of forming a sixth functionalized lactide monomer 602. FIG. 6B illustrates that, in some cases, the sixth functionalized lactide monomer 602 of FIG. 6A may be utilized to form a sixth matrix-bondable polylactide 604. FIG. 6C illustrates that, in some cases, a blend 606 (identified as "Lactide Feedstock Blend" in FIG. 6C) that includes an L-lactide monomer and the sixth functionalized lactide monomer 602 of FIG. 6A may be used to form a sixth matrix-bondable polylactide copolymer 608.

The first chemical reaction depicted in FIG. 6A illustrates the formation of a methylidene lactide molecule from an L-lactide molecule. The process of forming the methylidene lactide molecule may be similar to the process previously described herein with respect to FIG. 1A. The second chemical reaction depicted in FIG. 6A illustrates that a hydroxylactide material may be synthesized from the methylidene lactide intermediate material, in a manner similar to that previously described herein with respect to FIG. 4A. The third chemical reaction of FIG. 6A illustrates that the sixth functionalized lactide monomer 602 may be synthesized from the hydroxylactide material. In a particular embodiment, the hydroxylactide material may be chemically reacted with methacryloyl chloride under basic conditions to form the sixth functionalized lactide monomer 602, representing an example of an ether-linked methacryloyl lactide. As a prophetic example, 9-BBN (0.5 M in THF, 1.2 equiv.) may be added dropwise over 30 min to a stirred and cooled (0° C.) solution of methylidene lactide (1.0 equiv.) in THF (125 mL). The ice bath may be removed, and stirring may continue for 12 hours. The mixture may be cooled to 0° C. and quenched by dropwise addition of MeOH. Aqueous NaOH (2 M, >1.5 equiv.) and 30% $H_2O_2$ (>10.0 equiv.) may be poured into the stirred mixture. Stirring may continue for 2 hours, and the mixture may be extracted with $Et_2O$. The combined organic extracts may be washed with brine, dried over $Na_2SO_4$, and the solvent may be removed in vacuo. The crude product may be purified through column chromatography. To a solution of the purified product (1.0 equiv.) and triethylamine (1.0 equiv.) in anhydrous diethyl ether at 0° C., may be added methacroyl chloride (1.2 equiv.) dropwise. The reaction mixture may be warmed to room temperature, stirred for 12 hours, and poured into water. The layers may be separated, and the aqueous layer may be extracted with $Et_2O$. The combined organic extracts may be washed with brine, dried over $Na_2SO_4$, and the solvent may be removed in vacuo. The crude product may be purified through column chromatography.

Referring to FIG. 6B, a chemical reaction diagram 610 illustrates that the sixth functionalized lactide monomer 602 of FIG. 6A may be used to form a sixth matrix-bondable polylactide 604. In a particular embodiment, synthesis of the sixth matrix-bondable polylactide 604 may include the use of Lewis acid conditions, such as heating as a melt with tin(II) octanoate (identified as "$SnOct_2$" in FIG. 6B).

Referring to FIG. 6C, a chemical reaction diagram 620 illustrates an example of a process of forming a sixth matrix-bondable polylactide copolymer 608 from a blend 606 (identified as "Lactide Feedstock Blend" in FIG. 6C) that includes an unmodified L-lactide monomer and the sixth functionalized lactide monomer 602 of FIG. 6A. In the example of FIG. 6C, synthesis of the sixth matrix-bondable polylactide copolymer 608 from the blend 606 includes the use of Lewis acid conditions, such as heating as a melt with tin(II) octanoate.

FIG. 6C illustrates an example in which at least one of the functionalized lactide monomers of the present disclosure may be incorporated into a lactide polymer backbone by adding desired amount(s) of the functionalized lactide monomer(s) to a lactide feedstock prior to polymerization. In the particular embodiment depicted in FIG. 6C, the sixth functionalized lactide monomer 602 of FIG. 6A may be incorporated into the lactide polymer backbone by forming the blend 606. The blend 606 may include a first amount of the "conventional" L-lactide monomer and a second amount of the sixth functionalized lactide monomer 602 of FIG. 6A. Polymerization of the blend 606 results in the formation of a sixth matrix-bondable polylactide copolymer 608. In some cases, the matrix-bonding characteristics of the sixth matrix-bondable polylactide copolymer 608 may be "tuned" by varying the composition of the blend 606.

In FIG. 6C, the integer n is used to identify a portion of the lactide polymer backbone that corresponds to the L-lactide monomer (after ring-opening polymerization), and the integer m is used to identify a portion of the lactide polymer backbone that corresponds to the sixth functionalized lactide monomer 602 (after ring-opening polymerization). FIG. 6C depicts a particular embodiment in which a single functionalized lactide monomer of the present disclosure (e.g., the sixth functionalized lactide monomer 602 of FIG. 6A) is incorporated into the lactide polymer backbone. In other cases, the sixth functionalized lactide monomer 602 of FIG. 6A may be blended with one or more additional functionalized lactide monomers of the present disclosure in order to incorporate more than one cross-linkable moiety into a lactide polymer backbone. Other examples of functionalized lactide monomers are illustrated and further described herein with respect to FIGS. 1A, 2A, 3A, 4A, 5A, and 7A.

Thus, FIGS. 6A-6C illustrate an example of a process of forming a functionalized lactide monomer and utilizing the functionalized lactide monomer to form matrix-bondable polylactides or matrix-bondable polylactide copolymers.

While not shown in the example of FIGS. 6A-6C, the polylactides (functionalized with ether-linked methacryloyl groups) may be mixed with a particular polymeric matrix material (e.g., an acrylate-reactive polymer) in order to form a cross-linked polymeric material. The cross-linked polymeric material may be utilized to form an article of manufacture.

Referring to FIG. 7A, a chemical reaction diagram 700 illustrates an example of a process of forming a seventh functionalized lactide monomer 702. FIG. 7B illustrates that, in some cases, the seventh functionalized lactide monomer 702 of FIG. 7A may be utilized to form a seventh matrix-bondable polylactide 704. FIG. 7C illustrates that, in some cases, a blend 706 (identified as "Lactide Feedstock Blend" in FIG. 7C) that includes an L-lactide monomer and the seventh functionalized lactide monomer 702 of FIG. 7A may be used to form a seventh matrix-bondable polylactide copolymer 708.

The first chemical reaction depicted in FIG. 7A illustrates the formation of a methylidene lactide molecule from an L-lactide molecule. The process of forming the methylidene lactide molecule may be similar to the process previously described herein with respect to FIG. 1A. The second chemical reaction depicted in FIG. 7A illustrates that a hydroxylactide material may be synthesized from the methylidene lactide intermediate material, in a manner similar to that previously described herein with respect to FIG. 4A. The third chemical reaction of FIG. 7A illustrates that the seventh functionalized lactide monomer 702 may be synthesized from the hydroxylactide material. In a particular embodiment, the hydroxylactide material may be chemically reacted with 2-(oxiran-2-yl)acetyl chloride under basic conditions to form the seventh functionalized lactide monomer 702, representing an example of an ether-linked 2-(oxiran-2-yl)acetyl lactide. As a prophetic example, 9-BBN (0.5 M in THF, 1.2 equiv.) may be added dropwise over 30 min to a stirred and cooled (0° C.) solution of methylidene lactide (1.0 equiv.) in THF (125 mL). The ice bath may be removed, and stirring may continue for 12 hours. The mixture may be cooled to 0° C. and quenched by dropwise addition of MeOH. Aqueous NaOH (2 M, >1.5 equiv.) and 30% $H_2O_2$ (>10.0 equiv.) may be poured into the stirred mixture. Stirring may continue for 2 hours, and the mixture may be extracted with $Et_2O$. The combined organic extracts may be washed with brine, dried over $Na_2SO_4$, and the solvent may be removed in vacuo. The crude product may be purified through column chromatography. To a solution of the purified product (1.0 equiv.) and triethylamine (1.0 equiv.) in anhydrous diethyl ether at 0° C., may be added 2-(oxiran-2-yl)acetyl chloride (1.2 equiv.) dropwise. The reaction mixture may be warmed to room temperature, stirred for 12 hours, and poured into water. The layers may be separated, and the aqueous layer may be extracted with $Et_2O$. The combined organic extracts may be washed with brine, dried over $Na_2SO_4$, and the solvent may be removed in vacuo. The crude product may be purified through column chromatography.

Referring to FIG. 7B, a chemical reaction diagram 710 illustrates that the seventh functionalized lactide monomer 702 of FIG. 7A may be used to form a seventh matrix-bondable polylactide 704. In a particular embodiment, synthesis of the seventh matrix-bondable polylactide 704 may include the use of Lewis acid conditions, such as heating as a melt with tin(II) octanoate (identified as "$SnOct_2$" in FIG. 7B).

Referring to FIG. 7C, a chemical reaction diagram 720 illustrates an example of a process of forming a seventh matrix-bondable polylactide copolymer 708 from a blend 706 (identified as "Lactide Feedstock Blend" in FIG. 7C) that includes an unmodified L-lactide monomer and the seventh functionalized lactide monomer 702 of FIG. 7A. In the example of FIG. 7C, synthesis of the seventh matrix-bondable polylactide copolymer 708 from the blend 706 includes the use of Lewis acid conditions, such as heating as a melt with tin(II) octanoate.

FIG. 7C illustrates an example in which at least one of the functionalized lactide monomers of the present disclosure may be incorporated into a lactide polymer backbone by adding desired amount(s) of the functionalized lactide monomer(s) to a lactide feedstock prior to polymerization. In the particular embodiment depicted in FIG. 7C, the seventh functionalized lactide monomer 702 of FIG. 7A may be incorporated into the lactide polymer backbone by forming the blend 706. The blend 706 may include a first amount of the "conventional" L-lactide monomer and a second amount of the seventh functionalized lactide monomer 702 of FIG. 7A. Polymerization of the blend 706 results in the formation of a seventh matrix-bondable polylactide copolymer 708. In some cases, the matrix-bonding characteristics of the seventh matrix-bondable polylactide copolymer 708 may be "tuned" by varying the composition of the blend 706.

In FIG. 7C, the integer n is used to identify a portion of the lactide polymer backbone that corresponds to the L-lactide monomer (after ring-opening polymerization), and the integer m is used to identify a portion of the lactide polymer backbone that corresponds to the seventh functionalized lactide monomer 702 (after ring-opening polymerization). FIG. 7C depicts a particular embodiment in which a single functionalized lactide monomer of the present disclosure (e.g., the seventh functionalized lactide monomer 702 of FIG. 7A) is incorporated into the lactide polymer backbone. In other cases, the seventh functionalized lactide monomer 702 of FIG. 7A may be blended with one or more additional functionalized lactide monomers of the present disclosure in order to incorporate more than one cross-linkable moiety into a lactide polymer backbone. Other examples of functionalized lactide monomers are illustrated and further described herein with respect to FIGS. 1A, 2A, 3A, 4A, 5A, and 6A.

Thus, FIGS. 7A-7C illustrate an example of a process of forming a functionalized lactide monomer and utilizing the functionalized lactide monomer to form matrix-bondable polylactides or matrix-bondable polylactide copolymers. While not shown in the example of FIGS. 7A-7C, the polylactides (functionalized with ether-linked 2-(oxiran-2-yl)acetyl groups) may be mixed with a particular polymeric matrix material (e.g., a polymer that reacts with epoxy groups) in order to form a cross-linked polymeric material. The cross-linked polymeric material may be utilized to form an article of manufacture.

Figure 8:
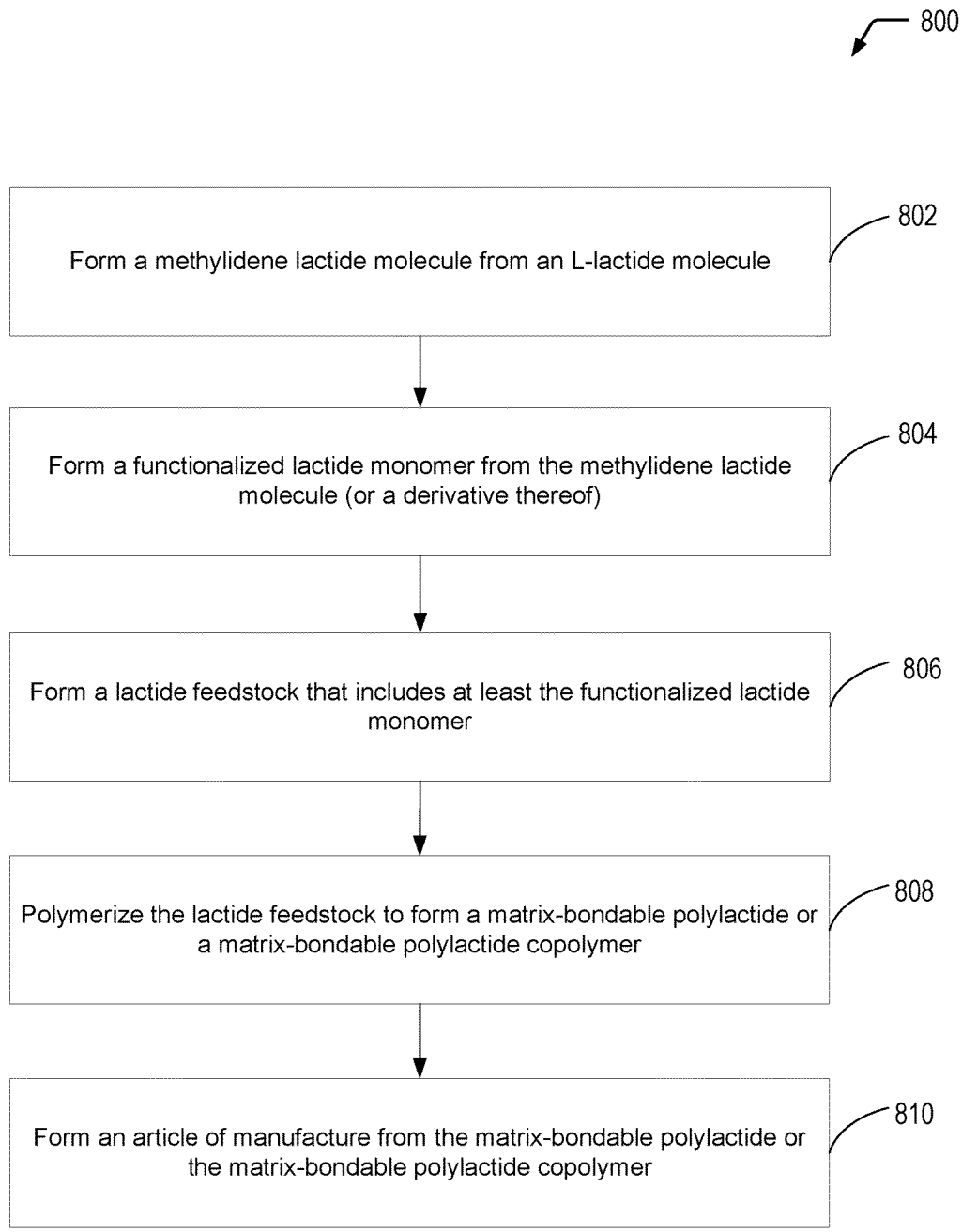
FIG. 8 is a flow diagram depicting a particular embodiment of a process of utilizing a functionalized lactide monomer derived from a methylidene lactide molecule to form a matrix-bondable polylactide or a matrix-bondable polylactide copolymer.

Referring to FIG. 8, a flow diagram illustrates a particular embodiment of a process 800 of utilizing a functionalized lactide monomer derived from a methylidene lactide molecule to form a matrix-bondable polylactide. In the particular embodiment depicted in FIG. 8, the process 800 further includes forming an article of manufacture from the matrix-bondable polylactide.

The process 800 includes forming a methylidene lactide molecule from an L-lactide molecule, at 802. For example, referring to FIG. 1A, the methylidene lactide molecule may be formed from the L-lactide molecule by radical bromination of the benzyl position of the L-lactide molecule by NBS using a radical initiator such as benzoyl peroxide in a solvent such as benzene, among other alternatives. Subsequently (identified as step 2 in FIG. 1A), elimination with triethylamine (NEt$_3$) in a solvent such as dichloromethane (DCM) results in the formation of the methylidene lactide intermediate material.

The process 800 includes forming a functionalized lactide monomer from the methylidene lactide molecule (or a derivative thereof), at 804. For example, referring to FIG. 1A, the methylidene lactide molecule may be utilized to form the first functionalized lactide monomer 102, representing an example of a thioether-linked epoxy lactide. As another example, referring to FIG. 2A, the methylidene lactide molecule may be utilized to form the second functionalized lactide monomer 202, representing an example of a siloxane lactide. As another example, referring to FIG. 3A, the methylidene lactide molecule may be utilized to form the third functionalized lactide monomer 302, representing an example of an epoxy lactide. As a further example, referring to FIGS. 4A, 5A, 6A, and 7A, the methylidene lactide molecule may be utilized to form hydroxylactide material, and the hydroxylactide material may be utilized to form the fourth functionalized lactide monomer 402 (in FIG. 4A), the fifth functionalized lactide monomer 502 (in FIG. 5A), the sixth functionalized lactide monomer 602 (in FIG. 6A), or the seventh functionalized lactide monomer 702 (in FIG. 7A).

The process 800 includes forming a lactide feedstock that includes at least the functionalized lactide monomer, at 806. The process 800 also includes polymerizing the lactide feedstock to form a matrix-bondable polylactide, at 808. In some cases, the lactide feedstock may include the functionalized lactide monomer(s). In other cases, the lactide feedstock may include a blend of an L-lactide monomer and the functionalized lactide monomer(s).

As an example, the first functionalized lactide monomer 102 of FIG. 1A may be polymerized to form the first matrix-bondable polylactide 104 (as shown in FIG. 1B). Alternatively, the first functionalized lactide monomer 102 may be blended with an L-lactide monomer to form the blend 106, and the blend 106 may be polymerized to form the first matrix-bondable polylactide copolymer 108 (as shown in FIG. 1C).

As another example, the second functionalized lactide monomer 202 of FIG. 2A may be polymerized to form the second matrix-bondable polylactide 204 (as shown in FIG. 2B). Alternatively, the second functionalized lactide monomer 202 may be blended with an L-lactide monomer to form the blend 206, and the blend 206 may be polymerized to form the second matrix-bondable polylactide copolymer 208 (as shown in FIG. 2C).

As a further example, the third functionalized lactide monomer 302 of FIG. 3A may be polymerized to form the third matrix-bondable polylactide 304 (as shown in FIG. 3B). Alternatively, the third functionalized lactide monomer 302 may be blended with an L-lactide monomer to form the blend 306, and the blend 306 may be polymerized to form the third matrix-bondable polylactide copolymer 308 (as shown in FIG. 3C).

As yet another example, the fourth functionalized lactide monomer 402 of FIG. 4A may be polymerized to form the fourth matrix-bondable polylactide 404 (as shown in FIG. 4B). Alternatively, the fourth functionalized lactide monomer 402 may be blended with an L-lactide monomer to form the blend 406, and the blend 406 may be polymerized to form the fourth matrix-bondable polylactide copolymer 408 (as shown in FIG. 4C).

As another example, the fifth functionalized lactide monomer 502 of FIG. 5A may be polymerized to form the fifth matrix-bondable polylactide 504 (as shown in FIG. 5B). Alternatively, the fifth functionalized lactide monomer 502 may be blended with an L-lactide monomer to form the blend 506, and the blend 506 may be polymerized to form the fifth matrix-bondable polylactide copolymer 508 (as shown in FIG. 5C).

As a further example, the sixth functionalized lactide monomer 602 of FIG. 6A may be polymerized to form the sixth matrix-bondable polylactide 604 (as shown in FIG. 6B). Alternatively, the sixth functionalized lactide monomer 602 may be blended with an L-lactide monomer to form the blend 606, and the blend 606 may be polymerized to form the sixth matrix-bondable polylactide copolymer 608 (as shown in FIG. 6C).

As yet another example, the seventh functionalized lactide monomer 702 of FIG. 7A may be polymerized to form the seventh matrix-bondable polylactide 704 (as shown in FIG. 7B). Alternatively, the seventh functionalized lactide monomer 702 may be blended with an L-lactide monomer to form the blend 706, and the blend 706 may be polymerized to form the seventh matrix-bondable polylactide copolymer 708 (as shown in FIG. 7C).

In the particular embodiment depicted in FIG. 8, the process 800 further includes forming an article of manufacture from the matrix-bondable polylactide or the matrix-bondable polylactide copolymer, at 810.

Thus, FIG. 8 illustrates an example of a process of utilizing a functionalized lactide monomer derived from a methylidene lactide molecule to form a matrix-bondable polylactide or a matrix-bondable polylactide copolymer.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A process of forming a matrix-bondable polylactide, the process comprising:
    forming a methylidene lactide molecule from an L-lactide molecule;
    forming a functionalized lactide monomer from the methylidene lactide molecule, the functionalized lactide monomer including a functional group selected from the group consisting of: an epoxy functional group, a siloxane functional group, an allyl functional group, and a methacryloyl functional group;
    forming a lactide feedstock that includes at least the functionalized lactide monomer; and
    polymerizing the lactide feedstock to form a matrix-bondable polylactide.

2. The process of claim 1, wherein the lactide feedstock includes a blend of a first amount of an L-lactide monomer and a second amount of the functionalized lactide monomer, and wherein the matrix-bondable polylactide includes a matrix-bondable polylactide copolymer.

3. The process of claim 1, further comprising forming a hydroxyl-functionalized lactide intermediate molecule from the methylidene lactide molecule, and wherein the functionalized lactide monomer is formed from the hydroxyl-functionalized lactide intermediate molecule.

4. A matrix-bondable polylactide formed by a process comprising:

forming a lactide feedstock that includes at least a functionalized lactide monomer that is derived from a methylidene lactide molecule, the methylidene lactide molecule formed from an L-lactide molecule, the functionalized lactide monomer including a functional group selected from the group consisting of: an epoxy functional group, a siloxane functional group, an allyl functional group, and a methacryloyl functional group; and polymerizing the lactide feedstock to form a matrix-bondable polylactide.

5. The matrix-bondable polylactide of claim 4, wherein the lactide feedstock includes a blend of a first amount of an L-lactide monomer and a second amount of the functionalized lactide monomer, and wherein the matrix-bondable polylactide includes a matrix-bondable polylactide copolymer.

6. The matrix-bondable polylactide of claim 4, wherein the process further comprises forming the functionalized lactide monomer from the methylidene lactide molecule.

7. An article of manufacture formed by a process comprising:

forming a lactide feedstock that includes at least a functionalized lactide monomer that is derived from a methylidene lactide molecule, the methylidene lactide molecule formed from an L-lactide molecule, the functionalized lactide monomer including a functional group selected from the group consisting of: an epoxy functional group, a siloxane functional group, an allyl functional group, and a methacryloyl functional group;

polymerizing the lactide feedstock to form a matrix-bondable polylactide;

forming a mixture that includes the matrix-bondable polylactide and a polymeric matrix material;

initiating a chemical reaction to form a cross-linked polymeric material from the mixture; and forming an article of manufacture from the cross-linked polymeric material.

8. The article of manufacture of claim 7, wherein the lactide feedstock includes a blend of a first amount of an L-lactide monomer and a second amount of the functionalized lactide monomer, and wherein the matrix-bondable polylactide includes a matrix-bondable polylactide copolymer.

9. The article of manufacture of claim 7, wherein the functional group includes the epoxy functional group, and wherein the polymeric matrix material includes an epoxy-reactive polymer.

10. The article of manufacture of claim 7, wherein the functional group includes the siloxane functional group, and wherein the polymeric matrix material includes a siloxane-reactive polymer.

11. The article of manufacture of claim 7, wherein the functional group includes the allyl functional group, and wherein the polymeric matrix material includes an alkene-reactive polymer.

12. The article of manufacture of claim 7, wherein the functional group includes the methacryloyl functional group, and wherein the polymeric matrix material includes an acrylate-reactive polymer.

13. The process of claim 1, wherein the functionalized lactide monomer has the following chemical structure:

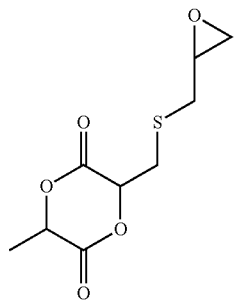

14. The process of claim 1, wherein the functionalized lactide monomer has the following chemical structure:

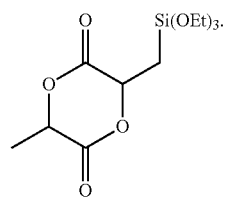

15. The process of claim 1, wherein the functionalized lactide monomer has the following chemical structure:

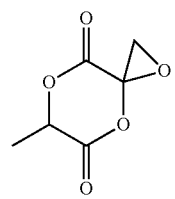

16. The process of claim 1, wherein the functionalized lactide monomer has the following chemical structure:

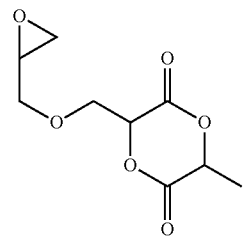

17. The process of claim 1, wherein the functionalized lactide monomer has the following chemical structure:

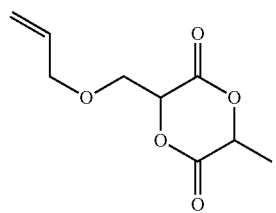

18. The process of claim 1, wherein the functionalized lactide monomer has the following chemical structure:
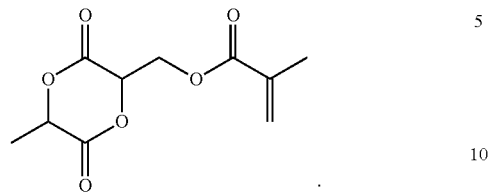
19. The process of claim 1, wherein the functionalized lactide monomer has the following chemical structure:
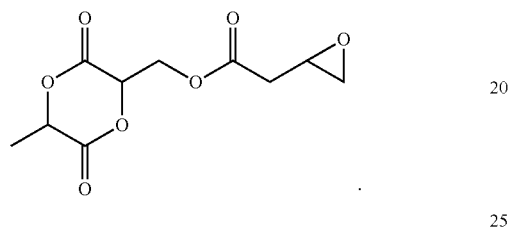
* * * * *